United States Patent

Brown et al.

[11] Patent Number: 5,833,261
[45] Date of Patent: Nov. 10, 1998

[54] FOOTREST MOVABLE BETWEEN TWO POSITIONS

[75] Inventors: Bryan M. Brown, East Amherst; Curt J. Mahlstedt, East Aurora, both of N.Y.

[73] Assignee: Fisher-Price, Inc., E. Aurora, N.Y.

[21] Appl. No.: 516,329

[22] Filed: Aug. 17, 1995

[51] Int. Cl.⁶ .................................................. B62B 7/06
[52] U.S. Cl. .................. 280/642; 280/643; 280/47.4; 280/648; 296/75; 297/423.26
[58] Field of Search ................... 280/642, 643, 280/647, 648, 658, 47.38, 47.39, 47.4; 296/75, 77.1; 297/423.26, 423.25

[56] References Cited

U.S. PATENT DOCUMENTS

| | | | |
|---|---|---|---|
| Re. 23,488 | 4/1952 | Raucher | 280/658 |
| 461,276 | 10/1891 | Rudolph | 280/643 |
| 1,870,983 | 8/1932 | Berman . | |
| 2,521,434 | 9/1950 | Wickman et al. | 280/647 |
| 2,663,589 | 12/1953 | Welsh | 296/75 |
| 2,693,366 | 11/1954 | Randolph | 280/47.4 |
| 4,037,614 | 7/1977 | Hines et al. | 135/5 A |
| 4,597,116 | 7/1986 | Kassai | 297/423.26 |
| 4,773,695 | 9/1988 | Jones et al. | 296/77.1 |
| 4,786,064 | 11/1988 | Baghdasarian | 280/648 |
| 4,805,928 | 2/1989 | Nakao et al. | 280/642 |
| 4,832,361 | 5/1989 | Nakao et al. | 280/642 |
| 4,846,521 | 7/1989 | Takahashi et al. | 296/77.1 |
| 4,923,208 | 5/1990 | Takahashi et al. | 280/642 |
| 4,953,887 | 9/1990 | Takahashi et al. | 280/647 |
| 4,997,154 | 3/1991 | Little | 248/225.31 |
| 5,028,061 | 7/1991 | Hawkes | 280/47.4 |
| 5,125,712 | 6/1992 | Stamoutsos | 296/77.1 |
| 5,234,224 | 8/1993 | Kim | 280/30 |

FOREIGN PATENT DOCUMENTS

2001810  10/1993  Russian Federation ............... 280/643

*Primary Examiner*—Brian L. Johnson
*Assistant Examiner*—Min Yu
*Attorney, Agent, or Firm*—Morgan, Lewis & Bockius LLP; C. Scott Talbot

[57] ABSTRACT

A footrest/cover member is attached to the frame of an infant or child carrier such as a stroller. The footrest/cover member is pivotally attached to the stroller frame by a bar traversing the two front leg portions. The footrest cover member can serve as a footrest for a stroller or may be rotated upward to engage a resilient tab on a grab bar, thus enclosing the stroller leg area when the carrier is serving as a bassinet/carriage.

9 Claims, 17 Drawing Sheets

FOOTREST MOVABLE BETWEEN TWO POSITIONS

BACKGROUND OF THE INVENTION

This invention relates to a footrest for an infant or child carrier such as a stroller. More specifically, the invention relates to a footrest which may also serve as a foot cover so as to convert a stroller into a bassinet/carriage. The footrest may be adjusted to accommodate the child's legs in a seated position wherein the front of the carrier is exposed, or the footrest may be rotated upward to engage with a grab bar so that the front of the carrier is fully enclosed, forming a bassinet/carriage.

Many existing infant carriers, particularly strollers, are capable of altering the angle of inclination of the back portion from a sitting position to a reclined or horizontal position. In addition, several designs for altering the position of a footrest are known. For example, U.S. Pat. No. 1,870,983 to Berman discloses a baby carriage having a foot well which may be raised and lowered as the infant grows. Hence, the infant carrier may be converted from a carriage to a stroller. However, the sides of the foot well are not fully enclosed.

U.S. Pat. No. 2,663,589 to Welsh discloses an adjustable foot well for strollers. The foot well may be adjusted to a stroller position in which it may receive the child's feet when in the sitting position or may be adjusted to a carriage position to accommodate a child while lying down. However, the foot well is secured in place via a series of complex linkage bars, pistons and tracks. Furthermore, the foot well also does not completely enclose the front region.

The foot cover disclosed in U.S. Pat. No. 4,846,521 to Takahashi et al. is for protecting the feet and legs of an infant, in a reclining position, from the wind. The foot cover is a wire bail surrounded by fabric which is retained in its raised position by holders attached to the front legs of the stroller. However, the foot cover is not a sturdy, integral member. Also, the side attachment points do not provide the convenient operation that would be provided by a single central latch arrangement.

SUMMARY OF THE INVENTION

The drawbacks of the prior art are overcome by the apparatus of the invention, which provides a footrest/cover member which is movable between a first, lowered, footrest position and a second, raised, bassinet/carriage position where the footrest/cover member encloses the front leg opening of an infant carrier.

More particularly, according to the present invention there is provided a footrest/cover member which is pivotally secured to an child carrier frame. The footrest/cover member may be pivotally attached to the frame by a bar traversing the two front leg portions. The footrest cover member can serve as a footrest or may be rotated upward and conveniently and easily be engaged to a grab bar that spans across the frame. The invention also may provide a convenient interlocking tab arrangement for releasably engaging the footrest/cover member with the grab bar. The invention is especially well suited for use on a stroller, and when used on a folding stroller, the footrest/cover member can remain engaged with the grab bar when the stroller is folded.

DETAILED DESCRIPTION

Referring to FIGS. 1 to 17 of the attached drawings, the preferred embodiment of the present invention will now be described. The invention is described and illustrated below in the context of an infant's stroller, although the invention may be used on any similar device, such as one in which the occupant may be seated or reclining (including, but not limited to, swings, bassinets, carriages, car seats, shopping carts, or walkers), where it is desirable to provide a footrest with the features described below.

Figure 1:
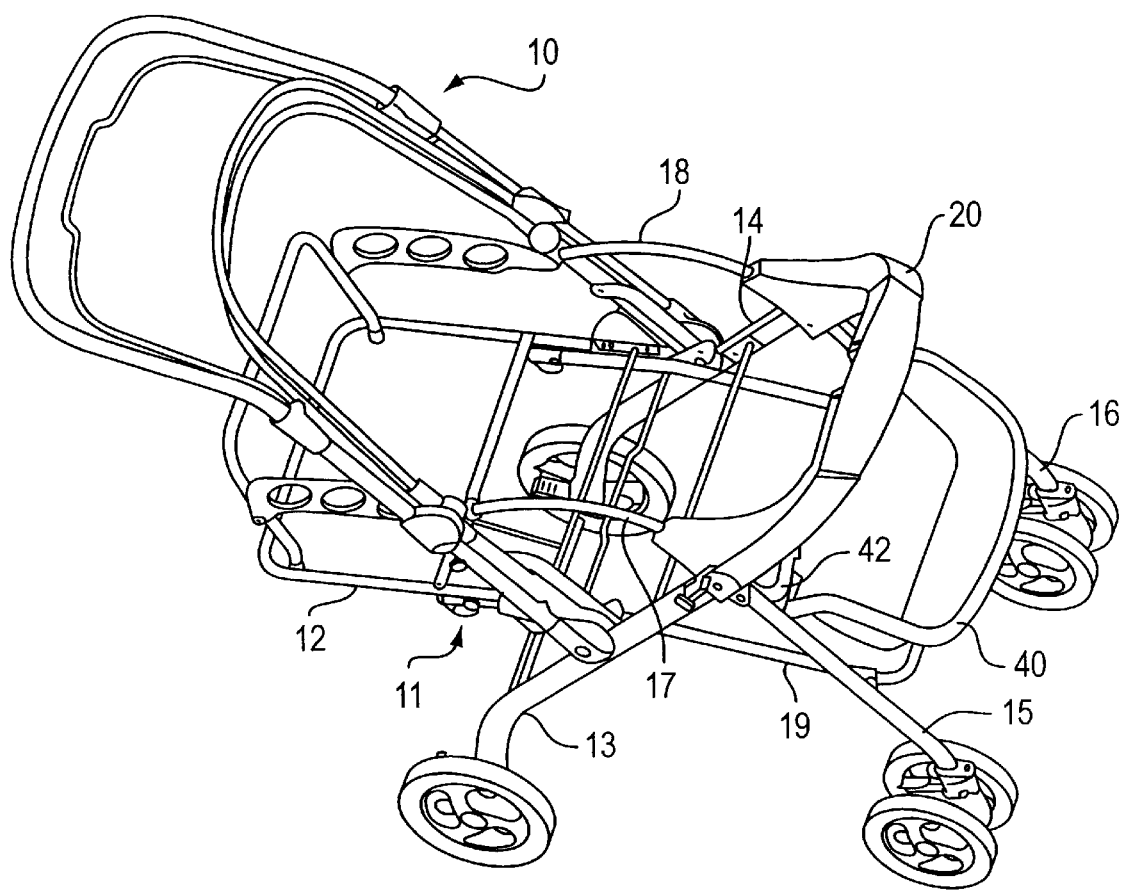
FIG. 1 shows a perspective view of an infant stroller employing a front footrest/cover member constructed in accordance with the invention when in its lowered (stroller) position.
Figure 2:
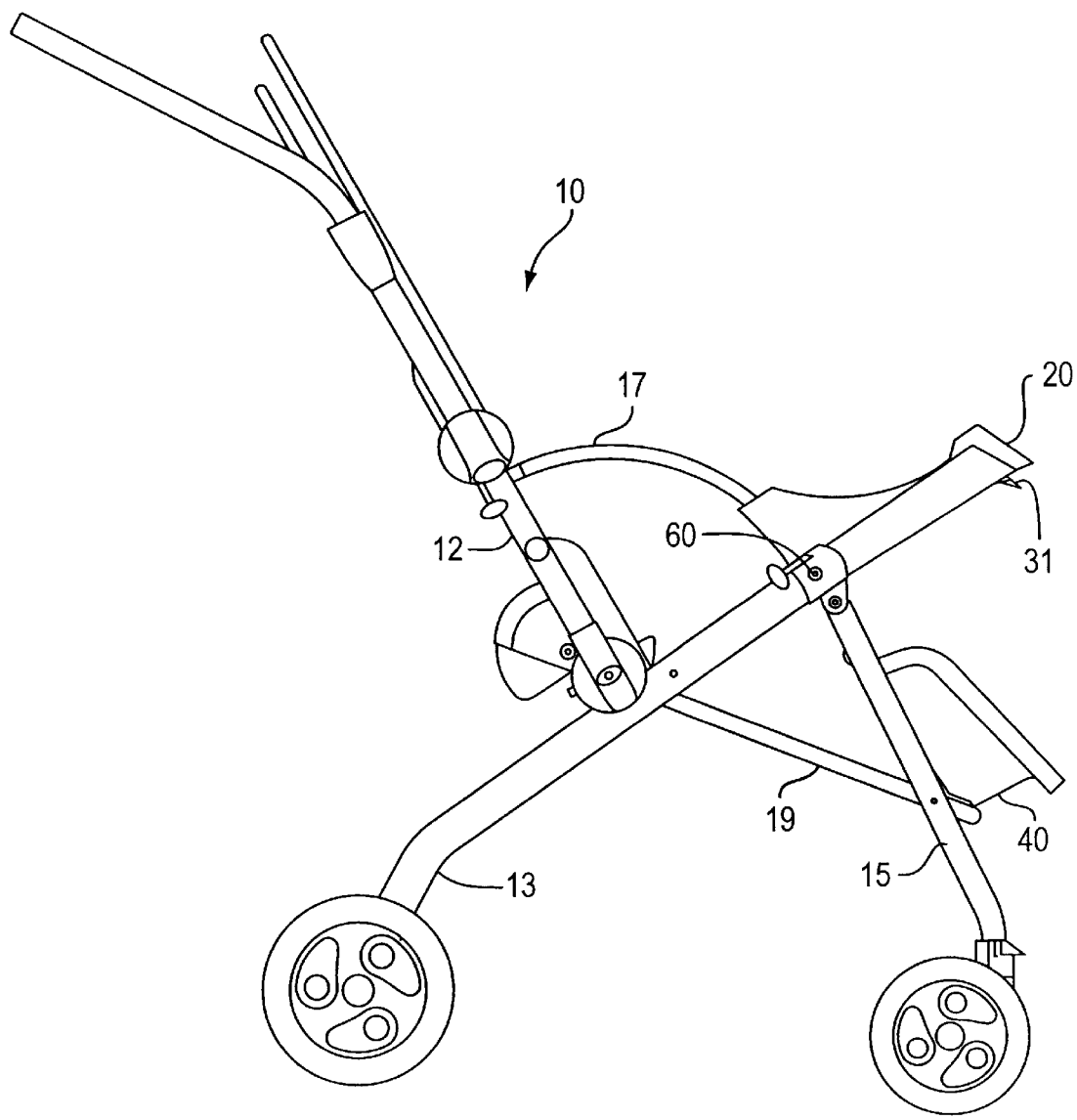
FIG. 2 is a side view of an infant stroller employing a front footrest/cover member constructed in accordance with the invention when it its lowered (stroller) position.
Figure 3:
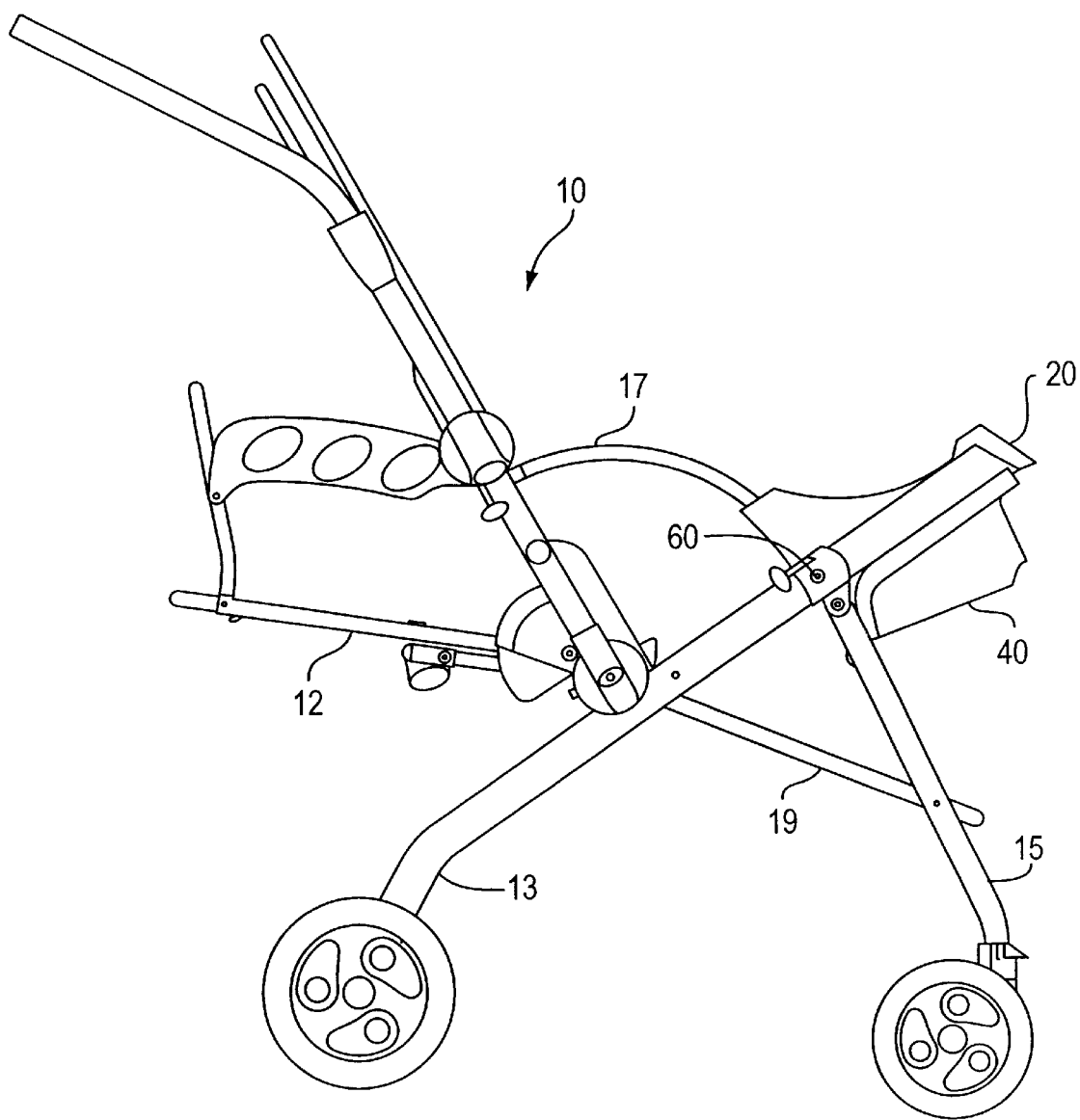
FIG. 3 is a side view of an infant stroller employing a front footrest/cover member constructed in accordance with the invention when in its raised (bassinet/carriage) position.
Figure 4:
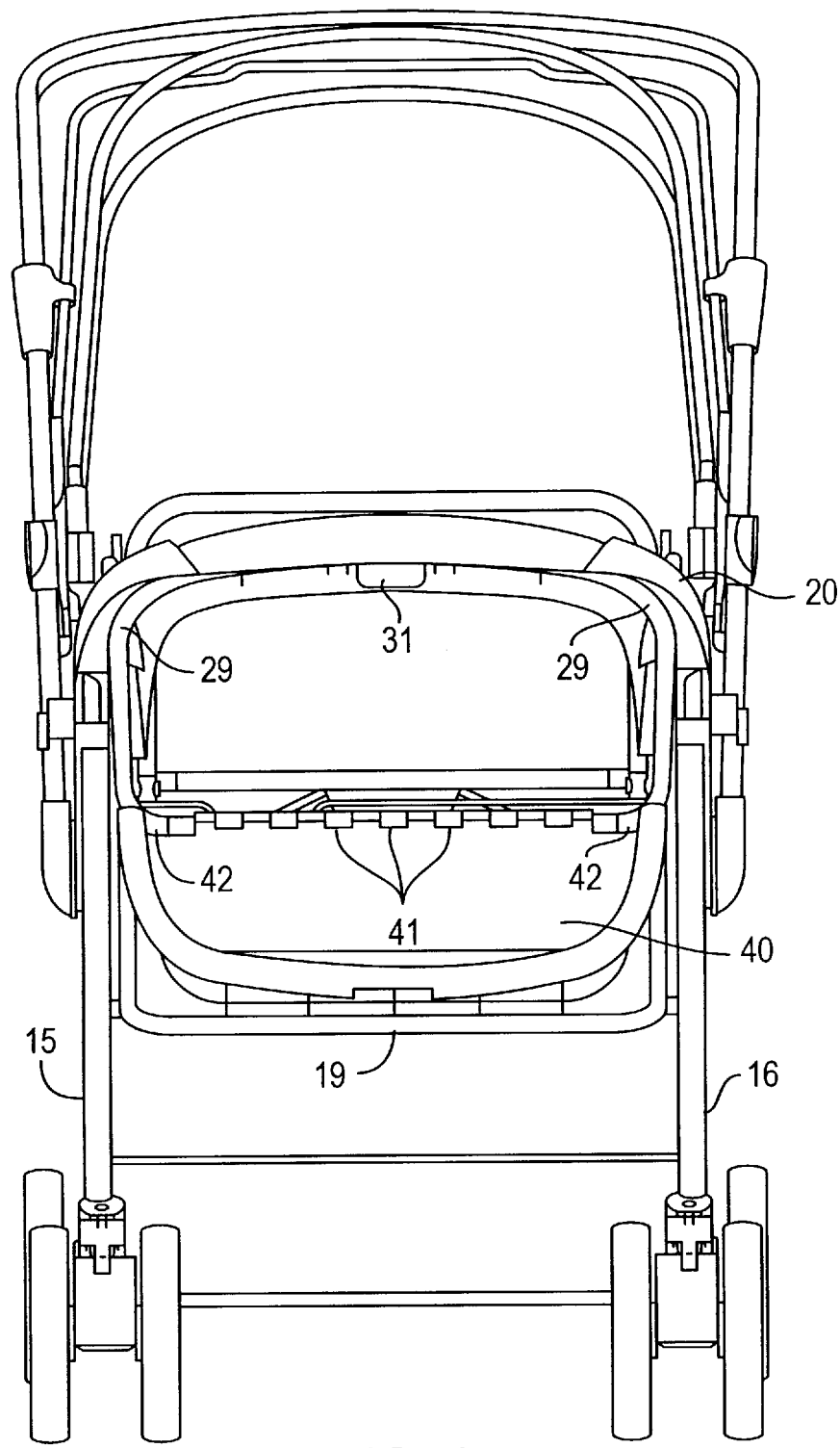
FIG. 4 is a front view of an infant stroller showing the footrest/cover member in its lowered (stroller) position.
Figure 5:
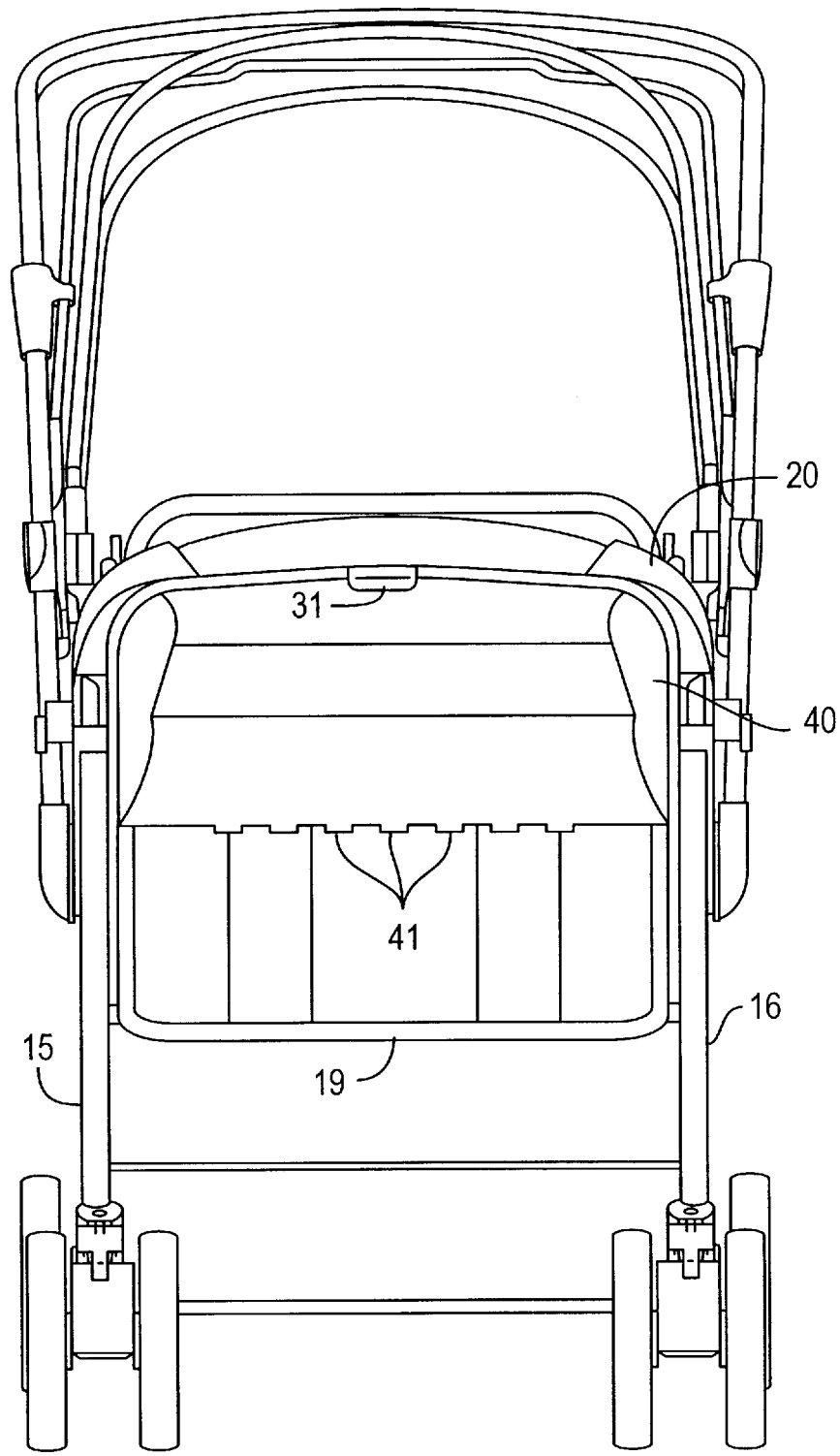
FIG. 5 is a front view of an infant stroller showing the footrest/cover member in its raised (bassinet/carriage) position.

A stroller 10 is illustrated in FIGS. 1 through 3. The stroller 10 has seat portion 11 including a reclining backrest portion 12 which has the capability of changing its angle of inclination between a sitting position and a reclining position. The backrest angle is not limited to only two positions and may, of course, be adjustable between three or more positions if desired. As described below, the reclining backrest portion 12 allows the carrier to serve as both a stroller (in which the child sits upright) and as a bassinet/carriage (in which the child can lie down). The stroller 10 has a frame including two opposed side portions, for example, first and second rear wheel support tubes 13, 14, first and second front wheel support tubes 15, 16, and first and second armrests 17, 18. The first and second armrests 17, 18 are rigidly affixed to a first laterally extending member 20, protruding through arm rest apertures 21, 22. The armrests 17, 18 extend through the member 20 and form a second laterally extending member (hinge tube) 42 about which the footrest/cover member 40 pivots (for purposes of brevity, the first laterally extending member 20 is referred to below as the a grab bar). A u-shaped connector tube 19 also spans between the side portions.

The support tubes 13, 14, 15, 16 and the U-shaped connector tube 19 are pivotally connected by conventional means, for example by rivets. The first and second armrests 17, 18, are pivotally connected to the first and second rear wheel support tubes 13, 14 at joint 60. The first and second front wheel support tubes 15, 16 are pivotally connected at joint offset from the joint 60. The grab bar 20 spans between the side portions, is rigidly attached to the armrests 17, 18, and the hinge tube 42, and thus the grab bar 20, armrests 17, 18, and the hinge tube 42 all pivot as one assembly about joint 60 relative to the ends of the first and second rear wheel support tubes 13, 14.

Figure 17:
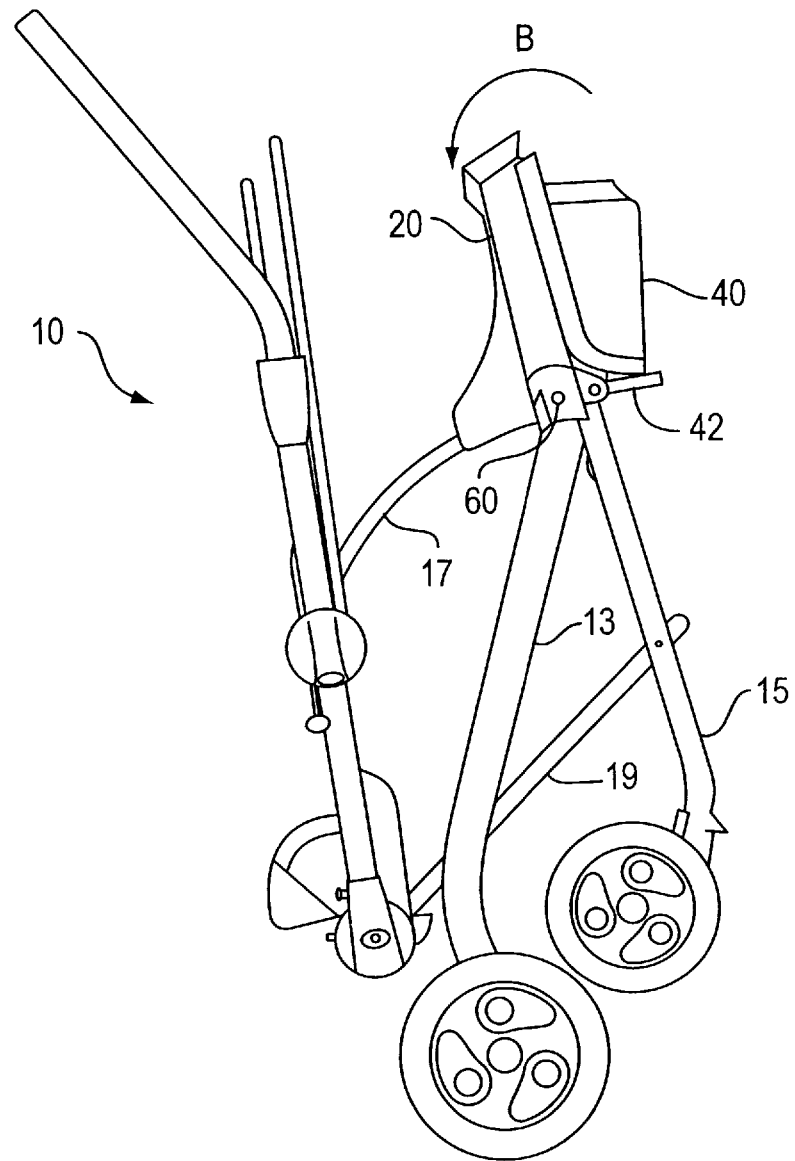
FIG. 17 is a side view of an infant stroller in its collapsed state showing the footrest/cover member remaining in its raised (bassinet/carriage) position.

The grab bar 20 is shown in more detail in FIGS. 6 through 10. The grab bar 20 includes first and second armrest apertures 21, 22 for receiving the first and second armrests 17, 18. On the outer edges 23 of the grab bar 20 are first and second rear wheel support tube receiving portions 24, 25. The grab bar 20 is mounted on a u-shaped lateral tube 29. As discussed in more detail below, the armrests 17, 18 and the hinge tube 42 are in the preferred embodiment comprised of a single unitary bent tube to which the lateral tube 29 is also affixed. This assembly including the armrests 17, 18, the lateral tube 29, the grab bar 20 and the hinge tube 42 pivots as a unit about the pivot 60 relative to the rear legs 13, 14 when the stroller is folded, as illustrated in FIG. 17.

Figure 6:
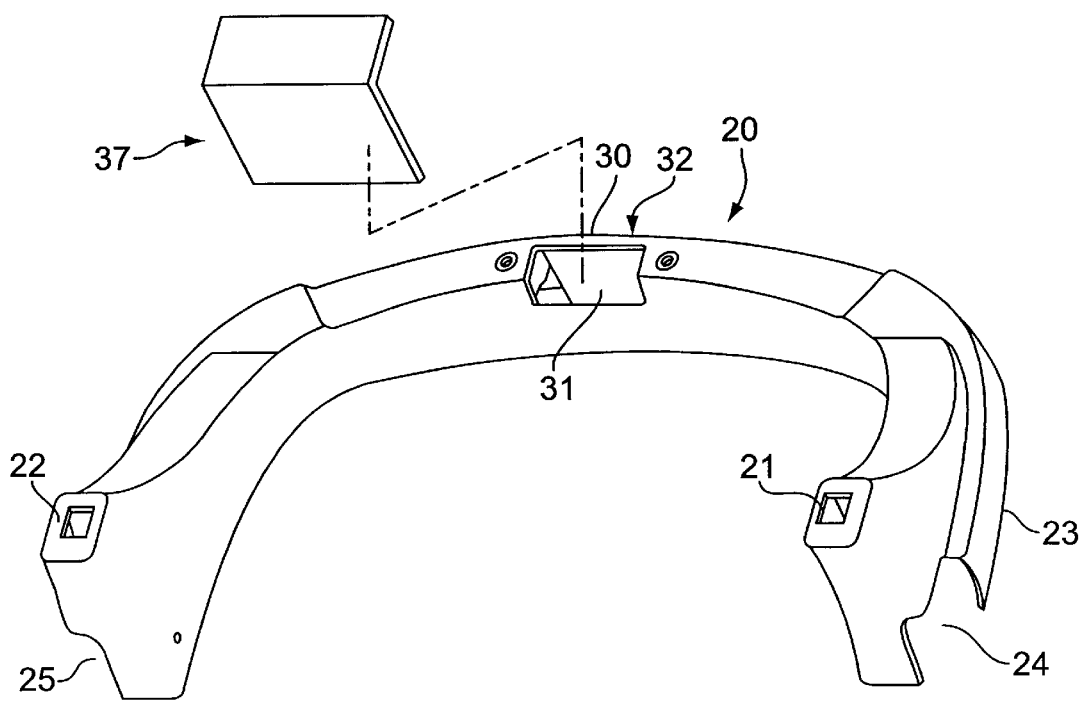
FIG. 6 is an exploded perspective view showing a first laterally extending member (grab bar)
Figure 7:
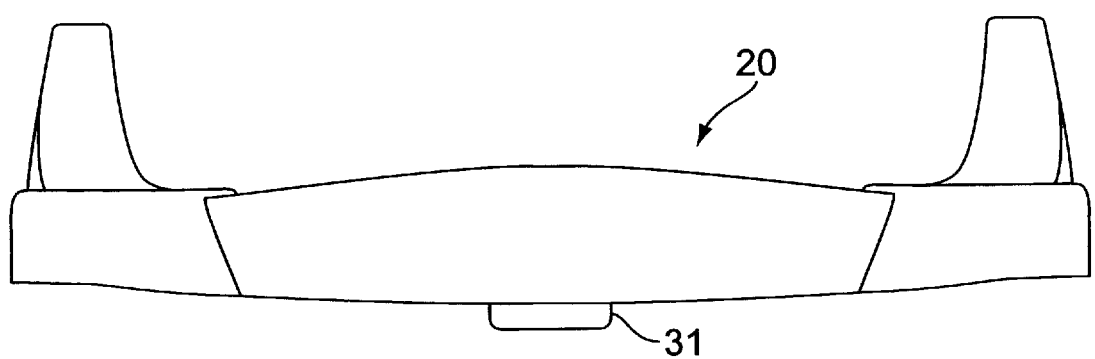
FIG. 7 is a front view of the grab bar.
Figure 8:
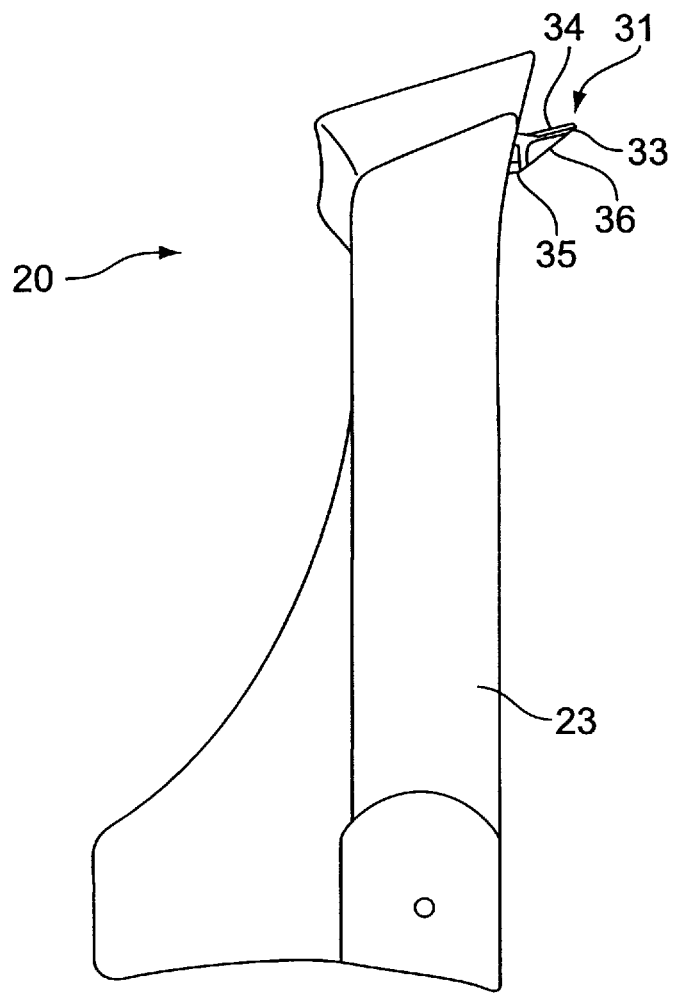
FIG. 8 is a side view of the grab bar.
Figure 9:
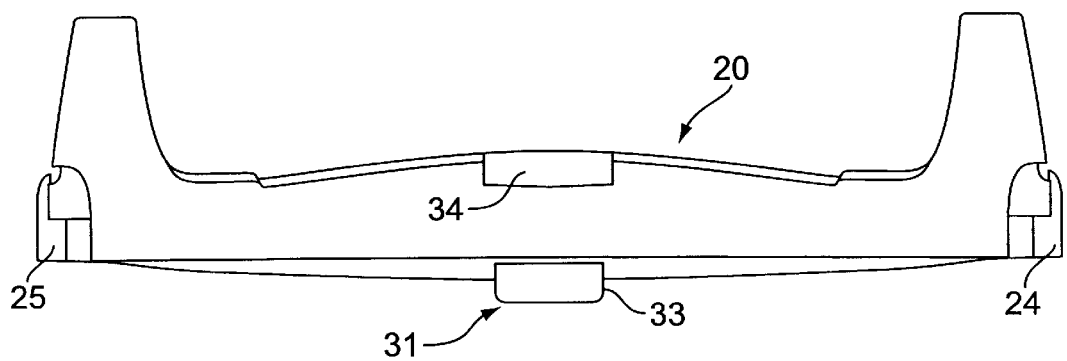
FIG. 9 is a rear view of the grab bar.
Figure 10:
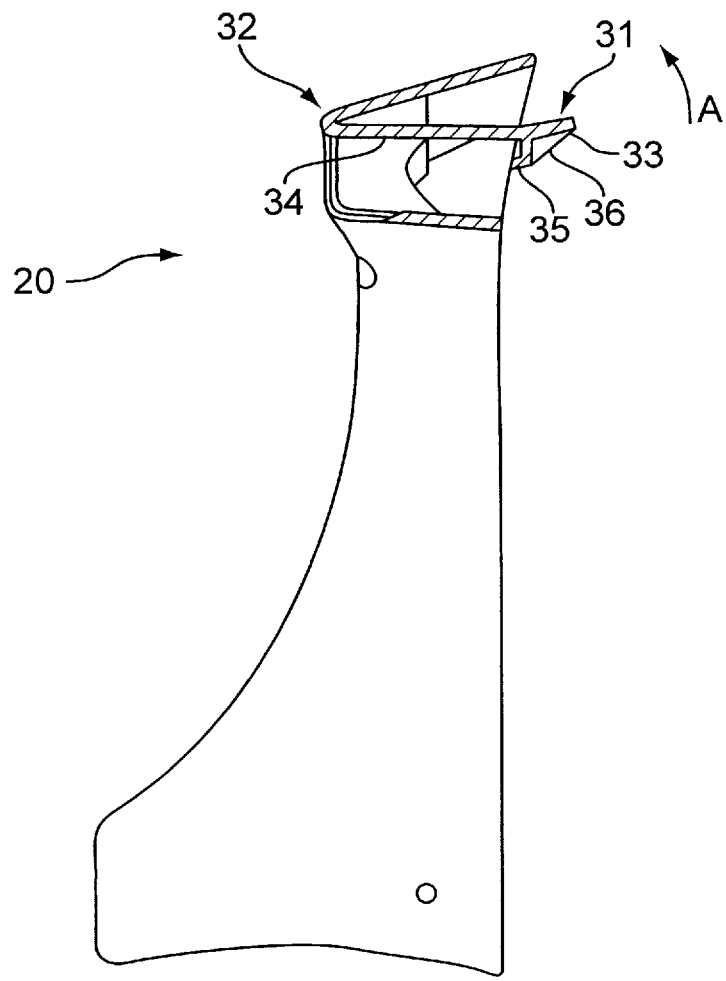
FIG. 10 is a cut-away side view of the grab bar.

As best shown in FIG. 6, the grab bar 20 includes a cut-out portion 30. During use, the top opening of cut-out portion 30 is covered by an L-shaped cover 37, which snaps on the grab bar. A resilient tab 31 (which serves as a second engaging portion), is nested within the cut-out portion 30. The resilient tab 31 is integrally affixed to the front center portion 32 of the grab bar 20, as best shown in FIG. 10. A finger lever 33 resides at the terminal end of the resilient tab 31. Between the intersection of the finger lever 33 and the elongate tab portion 34 of he resilient tab 31, and away from the main body of the grab bar 20, lies a retaining hook 35. Existing diagonally between the finger lever 33 and the retaining hook 35 resides a gusset 36, which in the preferred embodiment may be series of laterally spaced ribs. The gusset 36 serves both to reinforce the stability of the resilient tab 31 and, more importantly, to provide a cam surface (ramp) by which the footrest/cover member 40 may slide to engage the grab bar 20. The retaining hook 35 engages the retaining hook engagement notch 48 located on the underside of the footrest/cover member 40, which is described below.

The footrest/cover member 40 is hingedly attached to the stroller frame 10 (best shown in FIGS. 1–3). More particularly, in the preferred embodiment, the footrest hinge portion 41 rotates about a second laterally extending member, the hinge tube 42, which is an extension of armrests 17 and 18, located between the grab bar 20 and the u-shaped connector tube 19, although in other embodiments it could be hingedly coupled to the side portions of the frame. The footrest/cover member 40 may be a single unitary plastic component that has the hinge portion 41, a back wall portion 43a, a footrest portion 43b, and first and second side walls 44a, 44b, whose use will become apparent below.

Figure 11:
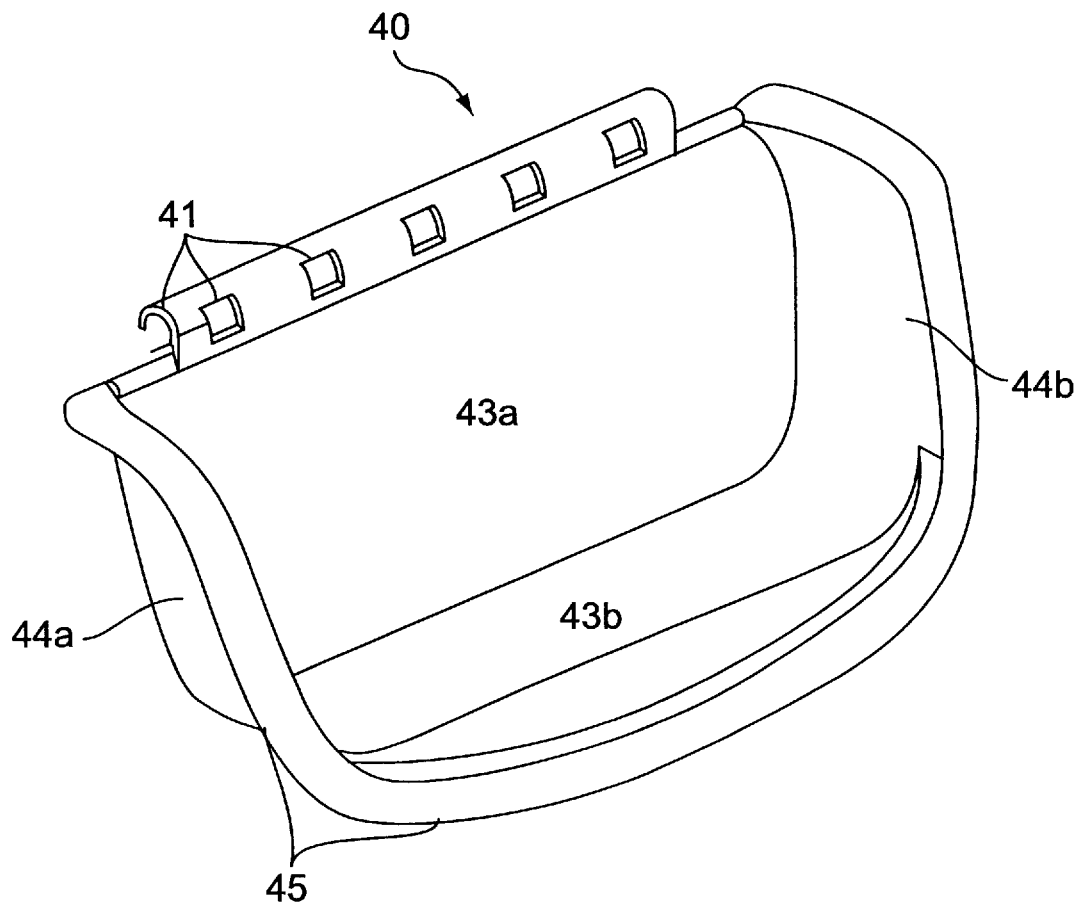
FIG. 11 is a perspective view showing the footrest/cover member.
Figure 12:
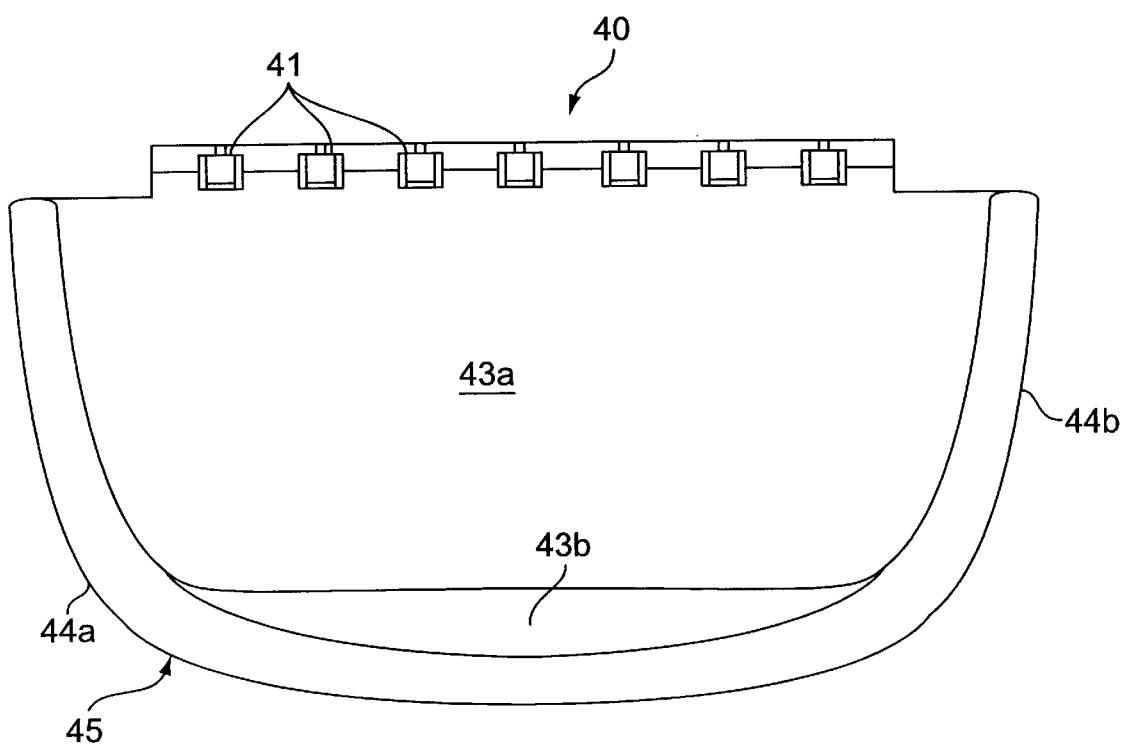
FIG. 12 is a front view of the footrest/cover member.
Figure 13:
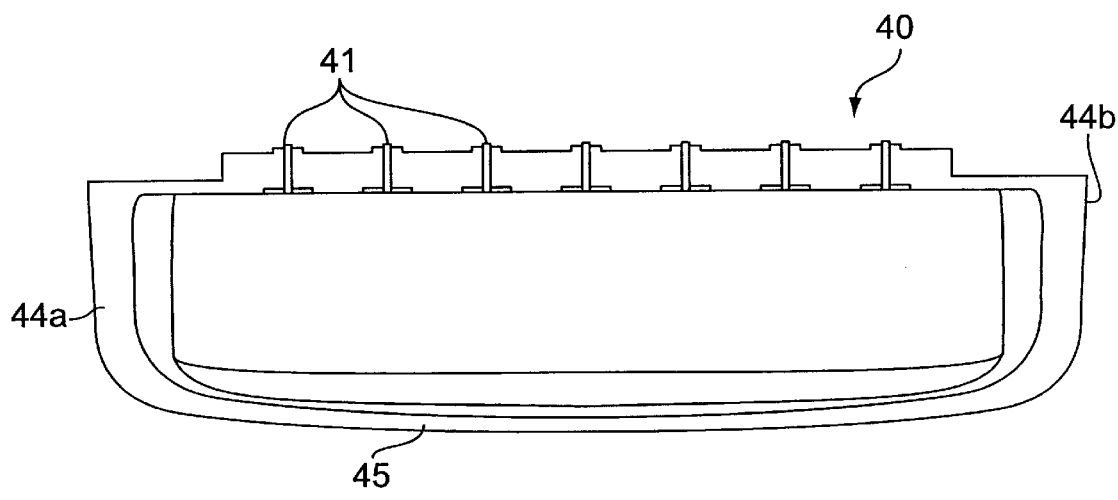
FIG. 13 is a top view of the footrest/cover member.
Figure 14:
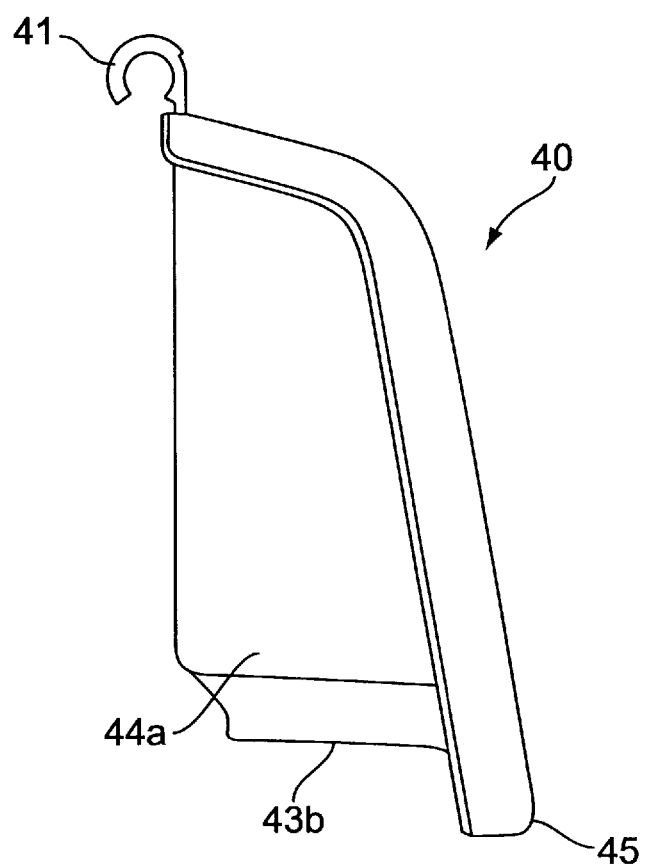
FIG. 14 is a side view of the footrest/cover member.
Figure 15:
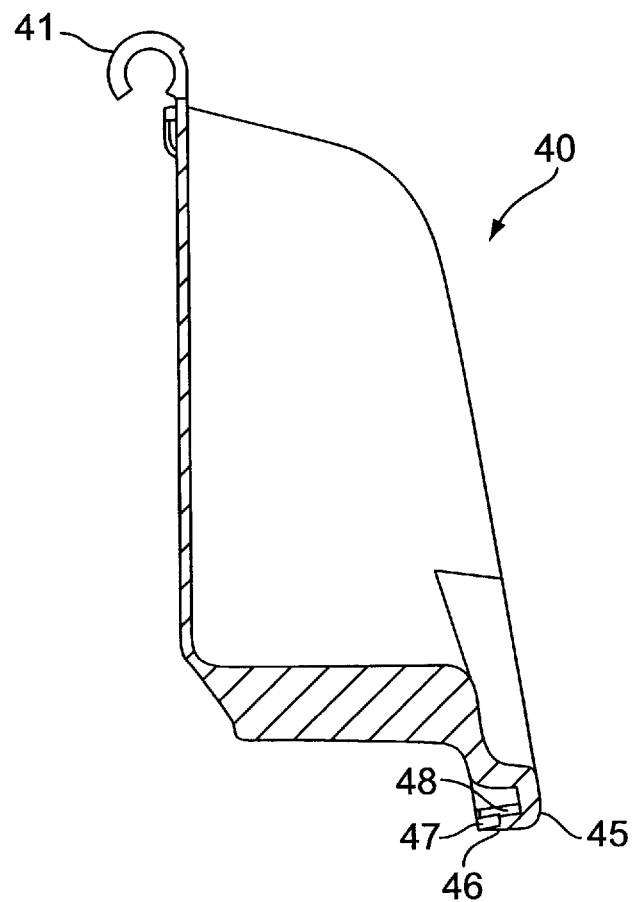
FIG. 15 is a cut-away side view of the footrest/cover member showing a locking hook engagement notch.
Figure 16:
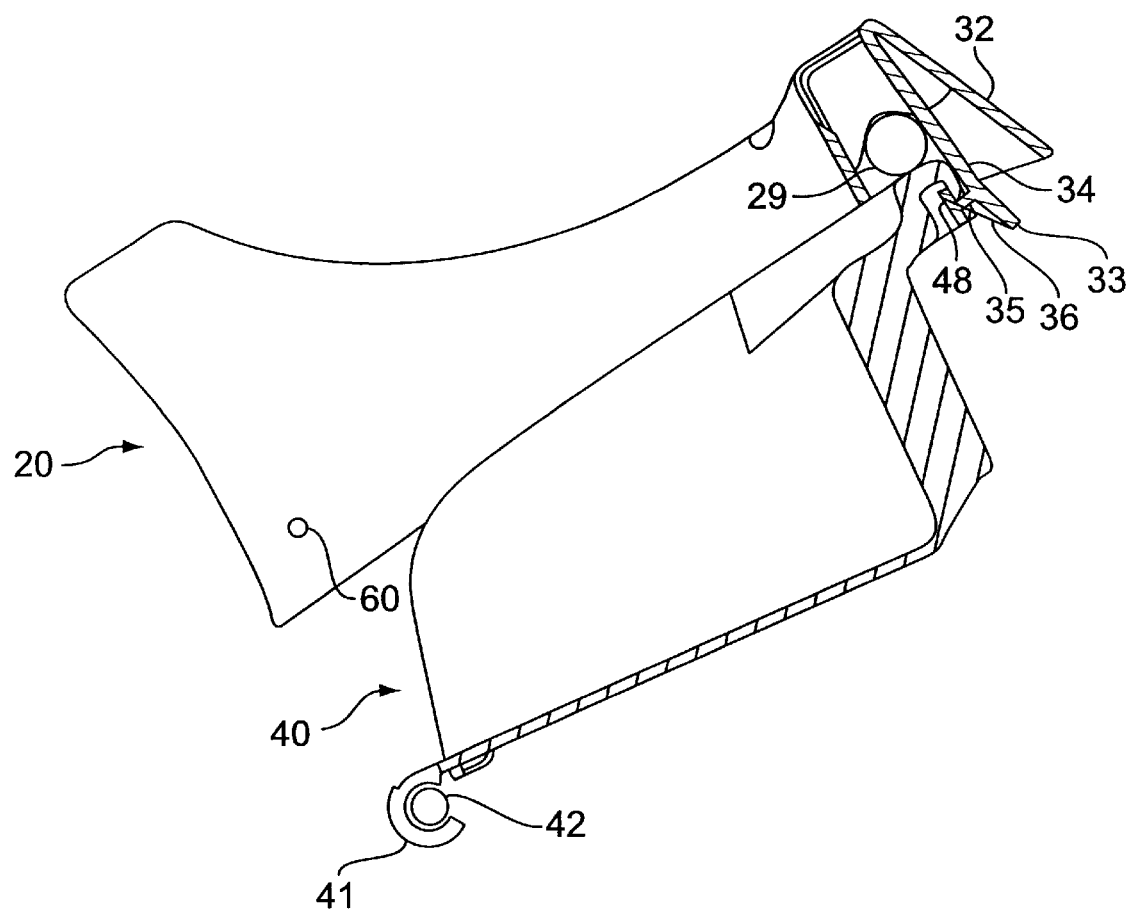
FIG. 16 is a cut-away side view showing the footrest/cover member locked in its raised (bassinet/carriage) position.

As shown in FIG. 11, the footrest/cover member 40 has an outer lip portion 45 extending around the circumference of the footrest/cover member 40. Located at the front center portion 46 of the footrest/cover member 40 is the elongate tab engagement notch 47. Located on the underside of the outer lip portion 45, and at the same location as the elongate tab engagement notch 47, is the retaining hook engagement notch 48, which serves as a first engaging portion that is capable of being releasably interlocked with the second engaging portion. The elongate tab engaging notch 47 and the retaining hook engagement notch 48 mate with the elongate tab 34 and the retaining hook 45 on the grab bar 20 as described below.

In the preferred embodiment, the footrest/cover member 40 is a unitary molded plastic member, which increases its sturdiness and durability. In addition, the unitary plastic design is lightweight and is simple to assemble to the stroller. Of course, the footrest/cover member 40 may be made of other materials or various components, if desired.

Operation

As shown in FIGS. 2 and 3, the footrest/cover member 40 is movable between a first and a second position. In the first position, illustrated in FIG. 2, the footrest/cover member 40 is in the footrest position. The lower rear surface 49 of the footrest/cover member 40 rests against the unshaped connector tube 19, whereby the stroller occupant may place his feet on the interior portion of the footrest 40. The first position is especially suited for use when the reclining backrest portion 12 is positioned to support the occupant in a sitting position.

In the second position, as show in FIG. 3, the footrest/cover member 40 may be pivoted upwardly about the second laterally extending member 42 so that it engages the grab bar 20. When in the locked position, the elongate tab portion 34 on the grab bar 20 interlocks with the elongate tab engagement notch 47 on the footrest/cover member 40. As the footrest/cover member 40 travels to its locking position (the second position), the elongate tab engagement notch 47 slides along the ramp formed by the gusset 36 on the resilient tab 31, forcing the resilient tab 31 to flex inwardly. When the terminal end of the retaining hook 35 travels beyond the edge of the front center portion 46, the retaining hook 35 mates with the retaining hook engagement notch 48 to lock the footrest/cover member 40 in the second position. The second position is especially suited for use when the reclining backrest position 12 is lowered into a fully reclined position on which the occupant may lie down. By lowering the reclining backrest portion 12 and enclosing the footrest area, the stroller 10 is converted into a bassinet/carriage. In the second position, the outer lip portion 45 abuts substantially flush with the grab bar 31 to completely or nearly completely block the leg opening.

In order to revert to the first position, the user lifts the footrest/cover member 40 (by applying an upward pressure to it) to release the interlocking pressure on the hook 35 and notch 48. The user then pulls the finger lever 33 in the direction indicated by arrow A in FIG. 10, disengaging the retaining hook engagement notch 48 from the retaining hook 35. The dual task required for releasing the footrest 40 from the grab bar 20 (lifting the footrest and pulling the tab) helps to prevent accidental disengagement during use. Of course, the hook 35 and notch 48 may be so designed to permit the footrest to be released merely by pulling the lever 33. In either case, the location of the footrest/cover member 20 in relation to the finger lever 33 allows the user to revert to the first position using only one hand. The geometry of the resilient tab 31 allows the retaining hook 35 to disengage from the retaining hook engagement notch 48 when the lever 33 is pulled, allowing the footrest/cover member 40 to fall to the first position unimpeded. The reclining backrest portion 12 can then be moved into the sitting position, providing a seat back for the occupant when the footrest/cover member 40 is in the first position.

As shown in FIG. 17, the stroller 10 may be folded into a compact unit without disengaging the footrest/cover member 40 from the grab bar 20. When the stroller is folded, the footrest/cover member will remain in the position it was in before folding—either engaged or disengaged with the grab bar—and it will remain in this position when the stroller is unfolded again. This is accomplished by providing the joint 60 at the intersection of the grab bar 20 and the rear wheel support tubes 13, 14. As best shown in FIG. 2, when the stroller 10 is in the stroller position, the grab bar 20 is substantially co-linear with the rear wheel support tubes 13, 14. In order to achieve a compact fold while maintaining the footrest 40 in the carriage/bassinet position, joint 60 is provided. During the folding process, the combination of the grab bar 20 and footrest 40 rotates about pivot point 60 in the direction indicated by arrow B in FIG. 17. Since the armrests 17, 18, the grab bar 20, the lateral tube 29, and the footrest hinge tube 43 all pivot as a single body about pivot 60, the footrest 40 effectively rotates about pivot 60 as does the grab bar 20. Accordingly, the footrest 40 may remain engaged with the grab bar 20, since both the grab bar 20 and the footrest 40 rotate about the same pivot 60 relative to the rear leg tubes 13, 14.

What is claimed is:

1. A stroller used to support a child occupant, comprising:
   a foldable stroller frame having a pair of opposed side portions and a grab bar spanning between said side portions, said grab bar including a first engaging portion; and
   a footrest/cover member movably coupled to said stroller frame, said footrest/cover member having a second engaging portion releasably engageable with said first engaging portion,
   wherein said stroller frame is foldable between a folded arrangement and an unfolded arrangement, and said footrest/cover member is movable between a first position where said second engaging portion is spaced from said first engaging portion and a second position where said second engaging portion is releasably engageable with said first engaging portion to hold said footrest/cover member adjacent said grab bar, said footrest/cover member being coupled to a portion of said frame that does not move with respect to said grab bar when said stroller frame is moved between said folded arrangement and said unfolded arrangement, whereby when said stroller frame is folded when said footrest/cover member is in said second position and said first and second engaging portions are engaged, said footrest/cover member remains engaged with said grab bar.

2. The stroller of claim 1 wherein said frame includes a back-supporting portion to support the child's back, said back-supporting portion being reclinable between a first, upright position and a second, reclined position and said footrest/cover member is adapted to be used in the first position when said back-supporting portion is upright and in the second position when said back-supporting portion is reclined.

3. The stroller of claim 1 wherein said footrest/cover member is pivotally coupled to said frame for pivotal movement relative thereto between the first and second positions.

4. The stroller of claim 1 wherein said frame includes a seat-supporting portion disposed to support the child's upper legs when in a seated position, said side portions, said grab bar, and said seat-supporting portion collectively define therebetween a leg opening for the child's legs when supported on the seat supporting portion and wherein said footrest/cover member has a footrest surface, two side surfaces and a leading edge, said leading edge abutting against said grab bar and each said side surface abutting one said side portion, respectively, when said footrest/cover member is in said second position, so that said footrest/cover member completely blocks said leg opening.

5. The stroller of claim 1 wherein said second engaging portion includes an engagement notch and said first engaging portion includes a resilient tab engageable with said engagement notch.

6. A stroller for supporting a child occupant in a seated position, comprising:
   a foldable frame having first and second side portions laterally spaced from each other, a seat-supporting portion, a back-supporting portion, and a grab bar, each of said seat-supporting portion, said back-supporting portion, and said grab bar being supported by, and disposed between, said side portions,
   said foldable frame being moveable between a first, folded configuration and a second, deployed configuration in which said seat-supporting portion is disposed to support the child's upper legs, and said back-supporting portion is disposed rearwardly of said seat-supporting portion to support the child's back, when the child is in the seated position, and said grab bar is disposed above and forwardly of said seat-supporting portion and is spaced from said seat-supporting portion sufficiently to permit the child's lower legs to extend between said seat-supporting portion and said grab bar;
   a footrest having a first end and an opposite, second end and being movably coupled at said first end to said frame forwardly of said seat-supporting portion for movement between a first position in which said second end is spaced from said grab bar and a second position in which said second end is adjacent said grab bar; and
   a latch having a first portion disposed on said grab bar and a second portion disposed on said second end of said footrest, said first and second latch portions being engageable when said footrest is in said second position, said latch supporting said footrest in said second position when said latch portions are engaged, wherein said footrest is coupled to a portion of said frame that does not move with respect to said grab bar when said stroller frame is moved between said folded configuration and said deployed configuration whereby when said stroller frame is folded when said footrest is in said second position, said footrest remains engaged with said grab bar.

7. A child carrier, comprising:
   a child carrier frame having a first engaging portion having a resilient tab with a finger lever portion and a locking hook portion; and
   a footrest/cover member movably coupled to said child carrier frame, said footrest/cover member having a second engaging portion releasably engageable with said first engaging portion, wherein said second engaging portion comprises a resilient tab engagement notch releasably engageable with said resilient tab,
   wherein said footrest/cover member is movable between a first position where said second engaging portion is spaced from said first engaging portion and a second position where said second engaging portion is releasably engaged with said first engaging portion and wherein when said footrest/cover member is in said second position said resilient tab engagement notch engages with said resilient tab to releasably engage said first portion with
   said second portion to secure said footrest/cover member against said laterally extending bar, and wherein said locking hook portion directly engages said tab engagement notch and said finger lever is operable to retract said locking hook portion from said tab engagement notch.

8. A child carrier according to claim 7, wherein said first and second engaging portions are each disposed approximately centrally between said side portions.

9. A child carrier for supporting a child occupant in a seated position, comprising:

- a child carrier frame having a seat-supporting portion disposed to support the occupant's upper legs when in the seated position, a pair of opposed side portions and a laterally extending member spanning between said side portions, said laterally extending member being spaced sufficiently above and in front of said seat-supporting portion to permit the occupant's lower legs to extend between said laterally extending member and said seat-supporting portion, said laterally extending member including a first engaging portion; and
- a footrest/cover member movably coupled to said child carrier frame in front of said seat-supporting portion for movement between a first position in which said footrest/cover member is disposed substantially below said seat-supporting portion and a second position in which said footrest/cover member is disposed adjacent said laterally extending member and positioned to support the occupant's lower legs, said footrest/cover member having a second engaging portion releasably engageable with said first engaging portion, said first engaging portion comprising a resilient tab, said second engaging portion comprising an engagement notch releasably engageable with said resilient tab, wherein when said footrest/cover member is in said second position said resilient tab engagement notch engages with said resilient tab to releasably engage said first portion with said second portion to support said footrest/cover member in said second position on said laterally extending member, wherein said resilient tab comprises a finger lever portion and a locking hook portion, wherein said locking hook portion directly engages said tab engagement notch and said finger lever is operable to retract said locking hook portion from said tab engagement notch.

* * * * *